(12) United States Patent
Shudo

(10) Patent No.: US 8,755,066 B2
(45) Date of Patent: Jun. 17, 2014

(54) IMAGE PROCESSING APPARATUS, IMAGE PROCESSING METHOD, RECORDING MEDIUM RECORDED WITH IMAGE PROCESSING PROGRAM, AND IMAGE PROCESSING SYSTEM

(75) Inventor: Takao Shudo, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 451 days.

(21) Appl. No.: 12/474,335

(22) Filed: May 29, 2009

(65) Prior Publication Data
US 2009/0296150 A1 Dec. 3, 2009

(30) Foreign Application Priority Data

May 30, 2008 (JP) ................. 2008-142866

(51) Int. Cl.
*G06F 3/12* (2006.01)
*G06K 15/02* (2006.01)
(52) U.S. Cl.
USPC ......... 358/1.15; 358/1.1; 358/1.13; 358/1.14; 358/1.16; 709/201; 726/14
(58) Field of Classification Search
USPC ............... 358/1.1, 1.13, 1.14, 1.15, 1.16; 709/201; 726/14
See application file for complete search history.

(56) References Cited

U.S. PATENT DOCUMENTS

| 6,100,992 A | 8/2000 | Yoshiura et al. | |
|---|---|---|---|
| 2003/0043416 A1* | 3/2003 | Rublee et al. | 358/402 |
| 2004/0003095 A1* | 1/2004 | Gitany-Alonso | 709/228 |
| 2004/0160630 A1 | 8/2004 | Iriyama et al. | |
| 2005/0046890 A1* | 3/2005 | Shudo | 358/1.14 |
| 2007/0201074 A1* | 8/2007 | Tashiro et al. | 358/1.13 |
| 2008/0022212 A1* | 1/2008 | Kodimer et al. | 715/744 |

FOREIGN PATENT DOCUMENTS

| JP | 09-186811 | 7/1997 |
|---|---|---|
| JP | 10-111793 | 4/1998 |
| JP | 3368134 B2 | 1/2003 |
| JP | 2004-228686 | 8/2004 |
| JP | 2005-079973 | 3/2005 |

OTHER PUBLICATIONS

Notice of Grounds of Rejection issued in the corresponding Japanese Patent Application No. 2008-142866 dated May 11, 2010, and an English Translation thereof.

* cited by examiner

*Primary Examiner* — Miya J Cato
(74) *Attorney, Agent, or Firm* — Buchanan Ingersoll & Rooney PC

(57) ABSTRACT

At an extended function server side, user information is received, and a user authentication process is executed. When the authenticity is established, an extended function table is read out, and an extended function list is generated in correspondence with users, based on the extended function table. Then, determination is made as to whether there is an extended function list set in correspondence with a user. When there is an extended function list set in correspondence with a user, the extended function list is transmitted. At the MFP side, the extended function list transmitted from the extended function server is received. Then, the received extended function list is registered.

26 Claims, 10 Drawing Sheets

| FUNCTION LABEL | MAIN LEVEL | SUBLEVEL | USAGE-ALLOWED USER |
|---|---|---|---|
| CLEANING | COPY | IMAGE ADJUSTMENT | A, B |
| | SCAN | IMAGE ADJUSTMENT | B |
| INCLINATION CORRECTION | COPY | IMAGE ADJUSTMENT | A, B |
| | SCAN | IMAGE ADJUSTMENT | A |
| SEARCHABLE PDF | COPY | IMAGE ADJUSTMENT | A, C |
| | SCAN | FILE FORMAT | A, B, C |
| NEGATIVE-POSITIVE PROCESS | COPY | IMAGE ADJUSTMENT | B, C |
| | SCAN | FILE FORMAT | B, C |

FIG.8

| FUNCTION LABEL | MAIN LEVEL | SUBLEVEL | USAGE-ALLOWED USER |
|---|---|---|---|
| CLEANING | COPY | IMAGE ADJUSTMENT | A, B |
| | SCAN | IMAGE ADJUSTMENT | B |
| INCLINATION CORRECTION | COPY | IMAGE ADJUSTMENT | A, B |
| | SCAN | IMAGE ADJUSTMENT | A |
| SEARCHABLE PDF | COPY | IMAGE ADJUSTMENT | A, C |
| | SCAN | FILE FORMAT | A, B, C |
| NEGATIVE-POSITIVE PROCESS | COPY | IMAGE ADJUSTMENT | B, C |
| | SCAN | FILE FORMAT | B, C |

FIG.9

USER B EXTENDED FUNCTION LIST

| CLEANING | COPY | IMAGE ADJUSTMENT |
|---|---|---|
| | SCAN | IMAGE ADJUSTMENT |
| INCLINATION CORRECTION | COPY | IMAGE ADJUSTMENT |
| SEARCHABLE PDF | SCAN | FILE FORMAT |
| NEGATIVE-POSITIVE PROCESS | COPY | IMAGE ADJUSTMENT |
| | SCAN | FILE FORMAT |

IMAGE PROCESSING APPARATUS, IMAGE PROCESSING METHOD, RECORDING MEDIUM RECORDED WITH IMAGE PROCESSING PROGRAM, AND IMAGE PROCESSING SYSTEM

This application is based on Japanese Patent Application No. 2008-142866 filed with the Japan Patent Office on May 30, 2008, the entire content of which is hereby incorporated by reference.

BACKGROUND OF THE INVENTION

1. Field of the Invention

The present invention relates to an image processing apparatus, an image processing method, a recording medium recorded with an image processing program, and an image processing system that allows execution of a scan function, a copy function or the like.

2. Description of the Related Art

Conventionally in an MFP (Multi Function Peripheral), an extended function can be added to the originally-registered function for usage. A new function item can be added to a pre-registered function list.

A user could conventionally look up in a function list or the like registered by another unrelated user for a function item of an extended function for his/her own use from the displayed function items, and then use the added extended function.

This process was complicated and not convenient since the user had to search for his/her own desirable function item from a function list registered by somebody else.

Japanese Patent No. 3368134, for example, discloses a device related to this issue. Specifically, there is disclosed the approach of improving the convenience in selecting the destination of transmission by classifying the generated document into a private document for personal use and a business document, depending on its contents, and setting the document in correspondence with the destination information.

Although the approach of improving the convenience of selecting the destination by classification is disclosed in the aforementioned Japanese Patent No. 3368134, there is no teaching as to the scheme of improving the convenience when an extended function for an MFP is added.

SUMMARY OF THE INVENTION

In view of the foregoing, an object of the present invention is to provide an image processing apparatus, an image processing method, a recording medium recorded with an image processing program, and an image processing system of high user convenience in the case where an extended function is added and used.

An image processing apparatus according to an aspect of the present invention includes a display unit configured to display an operation item, an operation unit for executing an operation process corresponding to the operation item displayed at said display unit, a user authentication unit for authenticating an input operator as a specified user according to a predetermined data input at the operation unit, a data memory unit for storing extended function information required to extend a function set in correspondence with the user authenticated by the user authentication unit, and a display control unit for displaying at the display unit, an extended function item of an extended function that can be selected at the operation unit, based on the extended function information stored in the data memory unit.

Preferably, the image processing apparatus includes an information transmission unit for transmitting image data and extended function select indication information to indicate execution of an extended function according to selection of an extended function item at the operation unit. The image data transmitted from the information transmission unit is subjected to execution of a predetermined image process based on the extended function select indication information. The image processing apparatus further includes an information reception unit for receiving an execution result of the predetermined image process on the image data.

Particularly, the image processing apparatus further includes an image formation unit for executing an image formation process of the image data subjected to execution of the predetermined image process, received at the image reception unit.

Preferably, at least one of the user authentication unit and data memory unit is connected via a network.

Particularly, the data memory unit is connected via the network. The image processing apparatus further includes a detection unit for detecting a data memory unit connected to the network.

Preferably, the extended function information includes classification information for classifying, according to a job, a plurality of extended function items to be displayed at the display unit. The display control unit displays an operation item to be displayed according to the job and an extended function item corresponding to the job, based on the classification information.

An image processing method according to another aspect of the present invention includes the steps of providing a display unit configured to display an operation item and an operation unit for executing an operation process corresponding to the operation item displayed at the display unit, executing a user authentication process with an input operator as a specified user according to a predetermined data input; obtaining extended function information required to extend a function in an image read process or an image formation process set in correspondence with the user authenticated by the user authentication process stored in a data memory unit; displaying an extended function item of an extended function that can be selected for the image read process or read image formation process at the display unit, based on the obtained extended function information; transmitting image data and extended function select indication information indicating execution of an extended function according to selection of an extended function item; transmitting image data and extended function select indication information indicating execution of an extended function according to selection of an extended function item; and receiving an execution result of a predetermined image process executed based on the extended function select indication information on the transmitted image data.

Preferably, the method further includes the step of executing an image formation process of the received image data subjected to execution of the predetermined image process.

Preferably, the data memory unit is connected via a network. The method further includes the step of detecting a data memory unit connected to the network.

Preferably, the extended function information includes classification information for classifying, according to a job, a plurality of extended function items to be displayed at the display unit. The displaying step includes the steps of displaying an operation item to be displayed according to the job and an extended function item corresponding to the job, based on the classification information.

A further aspect of the present invention is directed to a recording medium recorded with a computer-executable image processing program controlling an image processing apparatus providing a display unit configured to display an operation item and an operation unit for executing an operation process corresponding to the operation item displayed at the display unit. The recording medium is recorded with the image processing program, causing the computer to execute a process including the steps of executing a user authentication process with an input operator as a specified user according to a predetermined data input; obtaining extended function information required to extend a function in an image read process or an image formation process set in correspondence with the user authenticated by the user authentication process stored in a data memory unit; displaying an extended function item of an extended function that can be selected for the image read process or read image formation process at the display unit, based on the obtained extended function information; transmitting image data and extended function select indication information indicating execution of an extended function according to selection of an extended function item; and receiving an execution result of a predetermined image process executed based on the extended function select indication information on the transmitted image data.

Preferably, the recording medium is recorded with an image processing program causing a computer to execute a process further including the step of executing an image formation process of the received image data subjected to execution of the predetermined image process.

Preferably, the data memory unit is connected via a network, and the process further includes the step of detecting a data memory unit connected to the network.

Preferably, the extended function information includes classification information for classifying, according to a job, a plurality of extended function items to be displayed at the display unit, and the recording medium is recorded with an image processing program causing the computer to execute the process further including the step of displaying an operation item to be displayed according to the job and an extended function item corresponding to the job based on the classification information.

According to still another aspect of the present invention, an image processing system includes a server storing extended function information to extend a function, and an image processing apparatus connected to the server. The image processing apparatus includes a display unit configured to display an operation item, an operation unit for executing an operation process corresponding to the operation item displayed at the display unit, a user authentication unit for authenticating an input operator as a specified user according to a predetermined data input at the operation unit, an information reception unit for obtaining from the server, extended function information required to extend a function set in correspondence with the user authenticated by the user authentication unit, and a display control unit for displaying at the display unit, an extended function item of an extended function that can be selected at the operation unit, based on the extended function information stored in the server, obtained at the information reception unit.

Preferably, the image processing apparatus includes an information transmission unit for transmitting image data and extended function select indication information to indicate execution of an extended function according to selection of an extended function item at the operation unit. The server includes an extended function execution unit for executing a predetermined image process based on extended function select indication information on the image data transmitted from the image transmission unit, and an extended function execution result transmission unit for transmitting an execution result of the predetermined image process executed by the extended function execution unit. The image formation apparatus further includes an information reception unit for receiving the execution result of the predetermined image process on the image data transmitted from the extended function execution result transmission unit.

Particularly, the image processing apparatus further includes an image formation unit for executing an image formation process of the image data subjected to a predetermined image process received at the information reception unit.

Preferably, the server is connected via the network.

Particularly, the image processing apparatus further includes a detection unit to detect a server connected to a network.

Preferably, the extended function information includes classification information for classifying, according to a job, a plurality of extended function items to be displayed at the display unit. The display control unit displays an operation item to be displayed according to said job and an extended function item corresponding to the job, based on the classification information.

In the image processing apparatus, the image processing method, the recording medium recorded with an image processing program, and the image processing system, the display control unit adds to the operation item for display an extended function item of an extended function that can be selected at the operation unit, based on extended function information required to extend a function set in correspondence with a user authenticated at the user authentication unit. Accordingly, in the case where an extended function is added to be used, the user does not have to search for an extended function item for his/her own self from function items displayed at a function list or the like registered by another unrelated user. Therefore, the convenience is high since a function item of an extended function for his/her own self can be selected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram to describe an extended function table stored in a function module storage unit.

FIG. 9 is a diagram to describe an example of an extended function list set in correspondence with a user.

DESCRIPTION OF THE PREFERRED EMBODIMENTS

Figure 1:
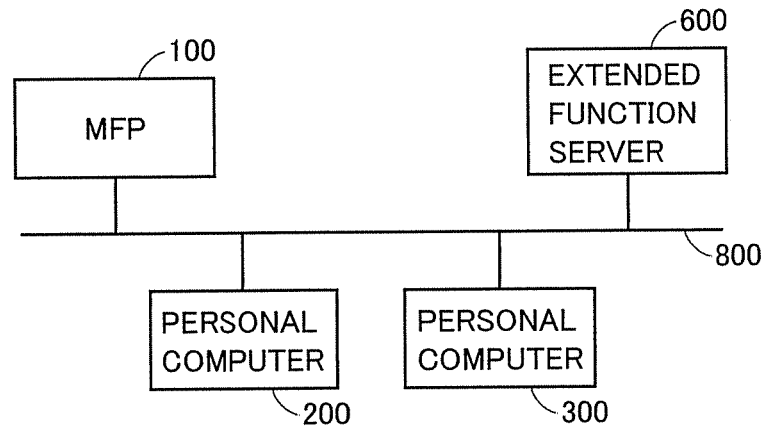
FIG. 1 is a schematic view for describing an extended function system of an image processing apparatus according to an embodiment of the present invention.

Embodiments of the present invention will be described hereinafter with reference to the drawings. In the following, the same components and constituent elements have the same reference characters allotted. Their designation and function are also the same.

An extended function system of an image processing apparatus according to an embodiment of the present invention will be described hereinafter with reference to FIG. 1.

Referring to FIG. 1, an extended function system of an image processing apparatus includes an MFP 100 with the capability as an image processing apparatus, personal computers 200 and 300, and an extended function server 600, all connected to each other through a network 800 to allow communication therebetween.

Network 800 includes a LAN (Local Area Network) such as the Ethernet (registered trademark), Token Ring, and FDDI (Fiber-Distributed Data Interface) connecting computers and network facilities with each other, a WAN (Wide Area Network) connecting LANs together through a dedicated line, the Internet, and the like. The type and number of apparatuses connected to network 800 are not limited to those set forth above.

Extended function server 600 is a server computer connected via network 800 to execute a user authentication process that will be described afterwards, and provide an extended function service that allows execution of a copy function or scan function at MFP 100.

Personal computers 200 and 300 are used by a specified user (for example, user A, user B, . . . ) accessible with respect to MFP 100 or extended function server 600.

A configuration of MFP 100 according to an embodiment of the present invention will be described with reference to FIG. 2.

Figure 2:
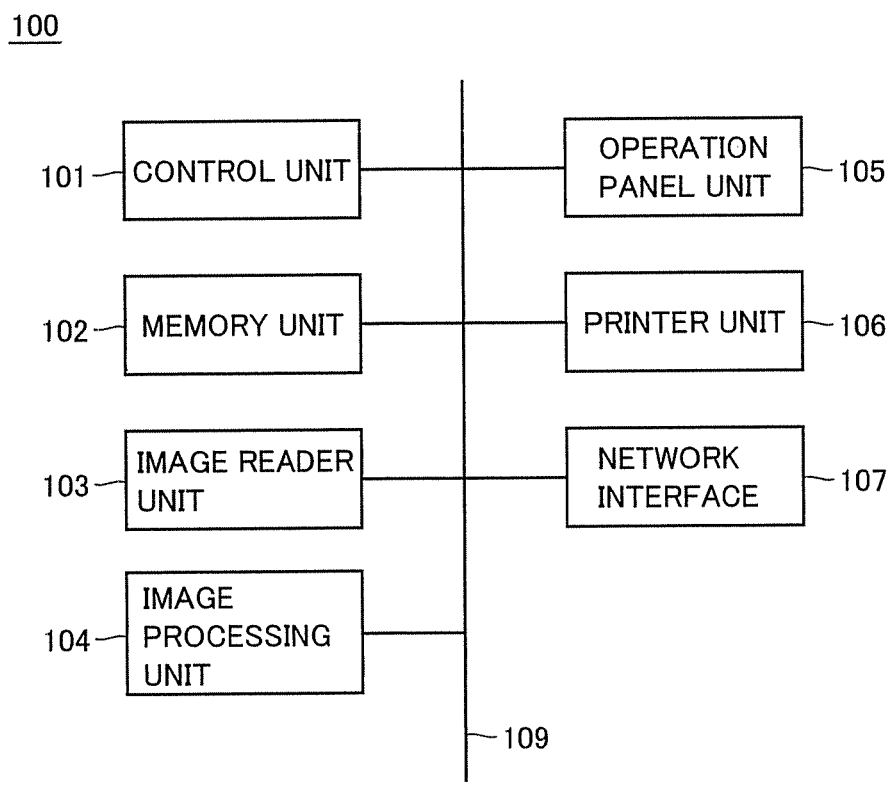
FIG. 2 is a schematic block diagram for describing a configuration of an MFP according to an embodiment of the present invention.

Referring to FIG. 2, MFP 100 of the present embodiment includes a control unit 101, a memory unit 102, an image reader unit 103, an image processing unit 104, an operation panel unit 105, a printer unit 106, and a network interface 107, which are all connected to allow communication with each other via a bus 109.

Control unit 101 is a CPU (Central Processing Unit), executing control of the aforementioned units and/or various operation processing according to a program stored in memory unit 102.

Memory unit 102 is formed of, for example, a ROM, a RAM, a hard disk, or the like, having various programs and data stored therein, and serving as a work region for execution of a program, and/or a region for storing image data or the like obtained by the image process at image processing unit 104.

Image reader unit 103 includes a light receiving element such as a CCD (Charge Coupled Device) for photoelectric conversion of light reflected from a document as a result of directing light to the document from a light source, and an automatic document feeder (ADF) to feed a document page to a predetermined read position. Image reader unit 103 obtains image data of an original from the light receiving element such as a CCD.

Image processing unit 104 executes format-conversion and the like to convert the format of the image data into a format suitable for data transmission.

Operation panel unit 105 includes a touch panel used for the display of various information and entry of various instructions, a ten-key for setting the number of copies and the like, a start key for designating initiation of an operation, a stop key for designating a halt in an operation, a reset key for initializing various setting conditions, and the like. The configuration of operation panel unit 105 will be described afterwards.

Printer unit 106 prints out image data read by image reader unit 103, and various data of image data obtained from an external device via the network interface onto a recording material such as a sheet of paper.

Network interface 107 serves to establish connection with network 800 for communication with another apparatus on the network.

MFP 100 includes, in addition to a copy function, a scan function to read an original to obtain image data, a print function receiving image data from an apparatus such as an external personal computer 200 or the like not shown for print out, a FAX function allowing facsimile transmission, and the like.

Operation panel unit 105 of MFP 100 shown in FIG. 2 will be described hereinafter with reference to FIG. 3.

Figure 3:
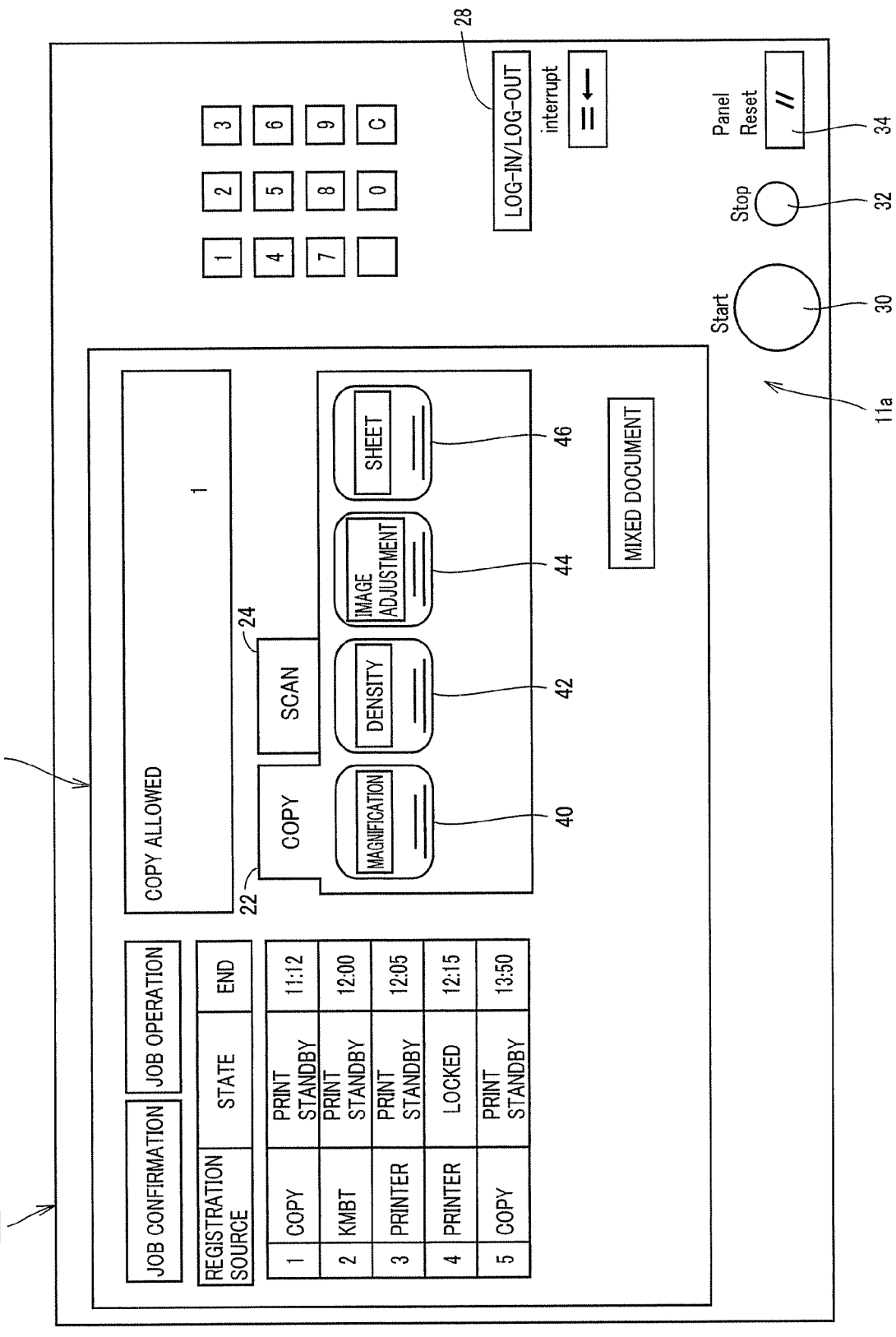
FIG. 3 is a diagram to describe an operation panel unit of the MFP of FIG. 2.

FIG. 3 represents a console 10 of operation panel unit 105 of MFP 100, Console 10 includes a key operation region 11a and a display region 20. Start key 30 located at key operation region 11a is used to initiate an operation such as copy/scanning. The ten-key identified as numeric key is used for the entry of a numeric value such as the number of copies. Stop key 32 is used to designate a halt of the copy/scan operation. Panel reset key 34 is used to eliminate a set mode or job.

The display of various modes is executed at display region 20. At the surface is provided a touch panel.

The user can execute various settings in accordance with the displayed contents at display region 20 through the touch panel. For example, when there is provided at display region 20 a setting screen such as of the user name (user ID) or the like that is the user identification information required for the user authentication process upon execution of a predetermined operation, the user can enter the user ID or the like using various keys at key operation region 11a and/or the touch button or the like displayed at display region 20. It is assumed that the user ID or the like, when entered, is registered as data for authentication at extended function server 600 connected via network 800, allowing a user authentication process with extended function server 600 thereafter.

Although the description is based on the case where a user ID or the like is set from the MFP side, direct access may be gained to extended function server 600 through a personal computer or the like to register the authentication data for executing the user authentication process.

In an operation mode of MFP 1, a log-in screen, for example, is displayed by depressing a log-in/log-out button 28, and a user authentication process can be executed with respect to extended function server 600 in response to the user entering a user ID or the like that is registered as authentication data.

Furthermore, buttons for basic/applicative setting conducted in the execution of a copy operation or scan operation are arranged at display region 20. Depression of a relevant button causes a hierarchy screen or the like for further detailed setting to be displayed.

Specifically, a selection tab 22 for operating in a copy mode, and a selection tab 24 for operating in a scan mode are located at display region 20. The user depresses a relevant selection tab to designate whether to operate in a copy mode or scan mode.

In the case where selection tab 22 for operating in a copy mode is depressed, MFP 1 can be used as a copy machine. A scanner operation cannot be executed under this state.

At this stage, a display to carry out various settings in the copy operation is provided at display region 20. Following the appropriate setting, depression of start key 30 with the document set causes initiation of a copy operation.

In contrast, when selection tab 24 for operating in a scan mode is depressed, MFP 1 functions as a scanner. Under this state, a copy operation cannot be executed.

At this stage, a display to carry out various settings in the scan operation is provided at display region 20. Following the appropriate setting, depression of start key 30 with the document set causes initiation of a scan operation. It is to be noted that selection tab 22 for operating in a copy mode and selection tab 24 for operating in a scan mode effect an exclusive operation. Namely, the selection of either one operation automatically renders the other non-selected.

The display of FIG. 2 represents an example when selection tab 22 for operating in a copy mode is depressed at display region 20.

Specifically, there is shown the display of a "magnification" button 40 for setting the magnification to magnify/shrink the copy, a "density" button 42 for adjusting the density, an "image adjust" button 44 for image adjustment, and a "sheet" button 46 for setting the sheet.

Detailed setting of a relevant function is allowed by depressing appropriate buttons. It is assumed that the selection, execution, and the like of the function item of the extended function are allowed, as will be described afterwards.

A configuration of the control unit to execute an extended function of the image processing apparatus according to an embodiment of the present invention will be described hereinafter with reference to FIG. 4.

Figure 4:
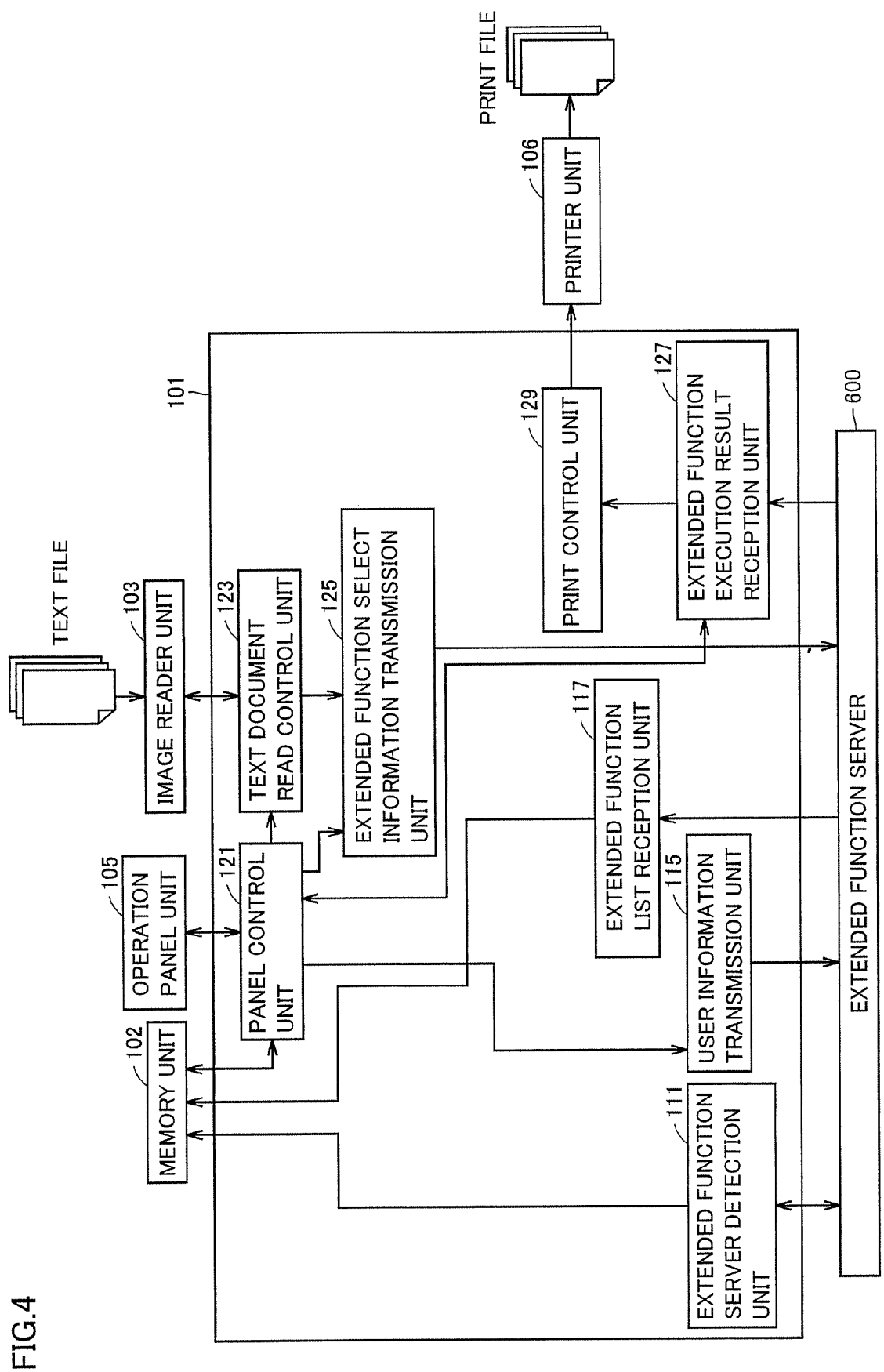
FIG. 4 is a schematic block diagram to describe a configuration of a control unit to execute an extended function of an image processing apparatus according to an embodiment of the present invention.

Referring to FIG. 4, control unit 101 includes an extended function server detection unit 111, a user information transmission unit 115, an extended function list reception unit 117, a panel control unit 121, a text document read control unit 123, an extended function select information transmission unit 125, an extended function execution result reception unit 127, and a print control unit 129.

Extended function server detection unit 111 detects an extended function server 600 by executing transmission and reception of data to and from extended function server 600. Extended function server detection unit 111 stores in memory unit 102 extended function server information based on the result of data transmission and reception with extended function server 600. Accordingly, a communication path is established between extended function server 600 and MFP 100.

User information transmission unit 115 responds to a user operation indication from panel control unit 121 to transmit the input user information (user ID and the like) to extended function server 600. Specifically, the input user information is sent as authentication data for execution of a user authentication process.

Extended function list reception unit 117 receives and stores in memory unit 102 an extended function list transmitted from extended function server 600.

Panel control unit 121 receives an operation indication input from operation panel unit 105 to execute a predetermined process and provides a display of function items to execute an extended function with respect to operation panel unit 105 based on the extended function list stored in memory unit 102.

Text document read control unit 123 controls image reader unit 103 in a copy or scan mode in response to an indication from panel control unit 121 such that image data read at image reader unit 103 is received and provided, as necessary, to extended function select information transmission unit 125.

Extended function select information transmission unit 125 transmits towards extended function server 600 extended function select indication information that will be described afterwards and the image data read at image reader unit 103 as extended function select information, when a function item of an extended function is selected in response to a predetermined operation input indication from operation panel unit 105.

Extended function execution result reception unit 127 receives the execution result of an extended function process executed at extended function server 600.

Print control unit 129 receives and provides to printer unit 106 the image data executed by the extended function received at extended function execution result reception unit 127.

Extended function server 600 according to an embodiment of the present invention will be described hereinafter with reference to FIG. 5.

Figure 5:
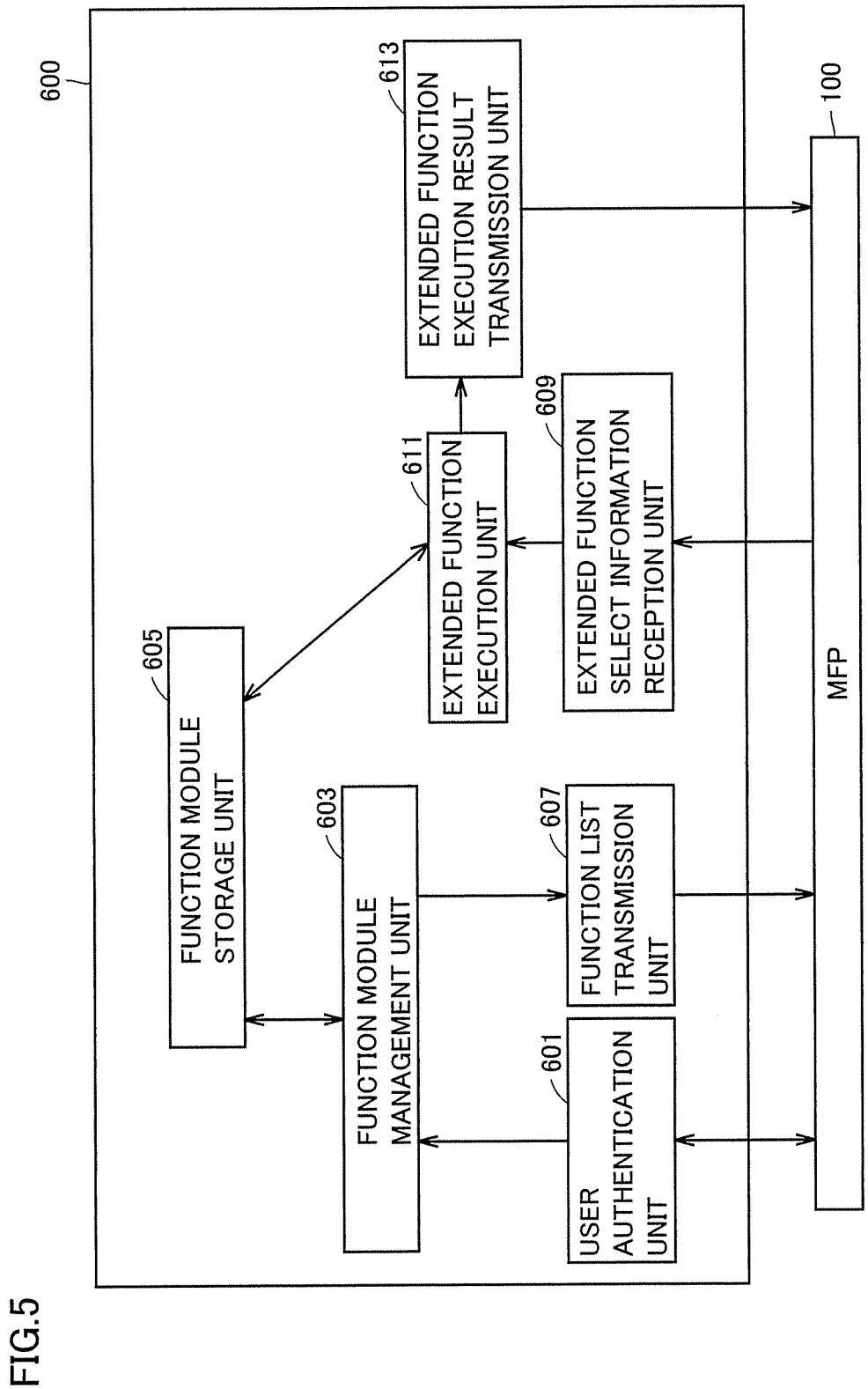
FIG. 5 is a schematic block diagram of an extended function server according to an embodiment of the present invention.

Referring to FIG. 5, extended function server 600 includes a user authentication unit 601, a function module management unit 603, a function module storage unit 605, a function list transmission unit 607, an extended function execution unit 611, an extended function select information reception unit 609, and an extended function execution result transmission unit 613.

User authentication unit 601 executes a user authentication process with MFP 100.

When the user authentication process succeeds based on the user authentication process result by user authentication unit 601, function module management unit 603 generates and provides to function list transmission unit 607 a function list of extended functions set in correspondence with a user based on an extended function table stored in function module storage unit 605, which will be described afterwards.

Function list transmission unit 607 provides the function list set in correspondence with a user, generated by function module management unit 603, to MFP 100.

Function module storage unit 605 stores an extended function table in which are registered user names and the like for each extended function, a program directed to execution of an extended function indicated in the extended function table, and the like It is assumed that an extended function table is stored, having users that are allowed usage registered in advance, in the present example. Registration of a user on the extended function table is carried out by an access to extended function server 600 through the user's terminal device such as personal computers 200 and 300, and executing a registration process.

Extended function select information reception unit 609 receives the extended function select information transmitted from MFP 100.

Extended function execution unit 611 reads out a program directed to execution of an extended function stored in function module storage unit 605 based on the extended function select information received at extended function select information reception unit 609 to execute an extended function process on the received image data included in the extended function select information.

The extended function includes, for example, still picture compression technique, JPEG 2000 that is an image format based on the still picture compression technique, the function to improve the picture quality of the image, and the like.

Extended function execution result transmission unit 613 provides the result of execution carried out at extended function execution unit 611 to MFP 100.

The detection flow of an extended function server 600 according to an embodiment of the present invention will be described with reference to FIG. 6.

Figure 6:
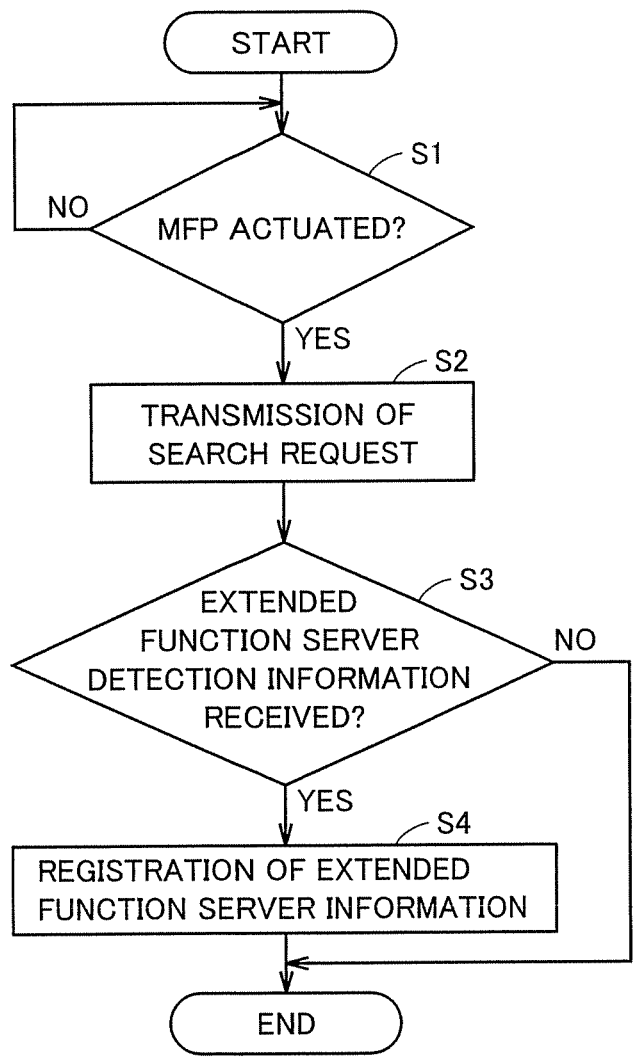
FIG. 6 is a diagram to describe a detection flow of an extended function server according to an embodiment of the present invention.

Referring to FIG. 6, determination is made as to whether the MFP has been actuated or not (step S1). When determination is made that the MFP has been activated at step S1, control proceeds to step S2 where extended function server detection unit 111 sends a search request. Specifically, a search request is dispatched towards network 800 connected through network interface 107.

Then, extended function server detection unit 111 determines whether detection information transmitted from extended function server 600 is received or not (step S3).

When the detection information transmitted from extended function server 600 has been received by extended function server detection unit 111 at step S3, extended function server information is registered (step S4).

Specifically, extended function server detection unit 111 stores in memory unit 102 the extended function server information based on the result of data transmission and reception with extended function server 600. Accordingly, a communication path is established between extended function server 600 and MFP 100.

When determination is made that extended function server detection unit 111 has not received detection information transmitted from extended function server 600 at step S3, the process ends since detection is not made. Although the present embodiment has been described corresponding to the case where a search request is transmitted from extended function server detection unit 111 on the part of MFP 100 and detection information transmitted from extended function server 600 is received for registration of the extended function server information, the present invention is not limited particularly thereto. For example, a configuration is allowed in which MFP 100 is detected on the part of extended function server 600, and extended function server information is transmitted to MFP 100 so that a communication path is established between extended function server 600 and MFP 100, followed by registration at MFP 100.

The process of registering an extended function list according to an embodiment of the present invention will be described with reference to FIG. 7.

Figure 7:
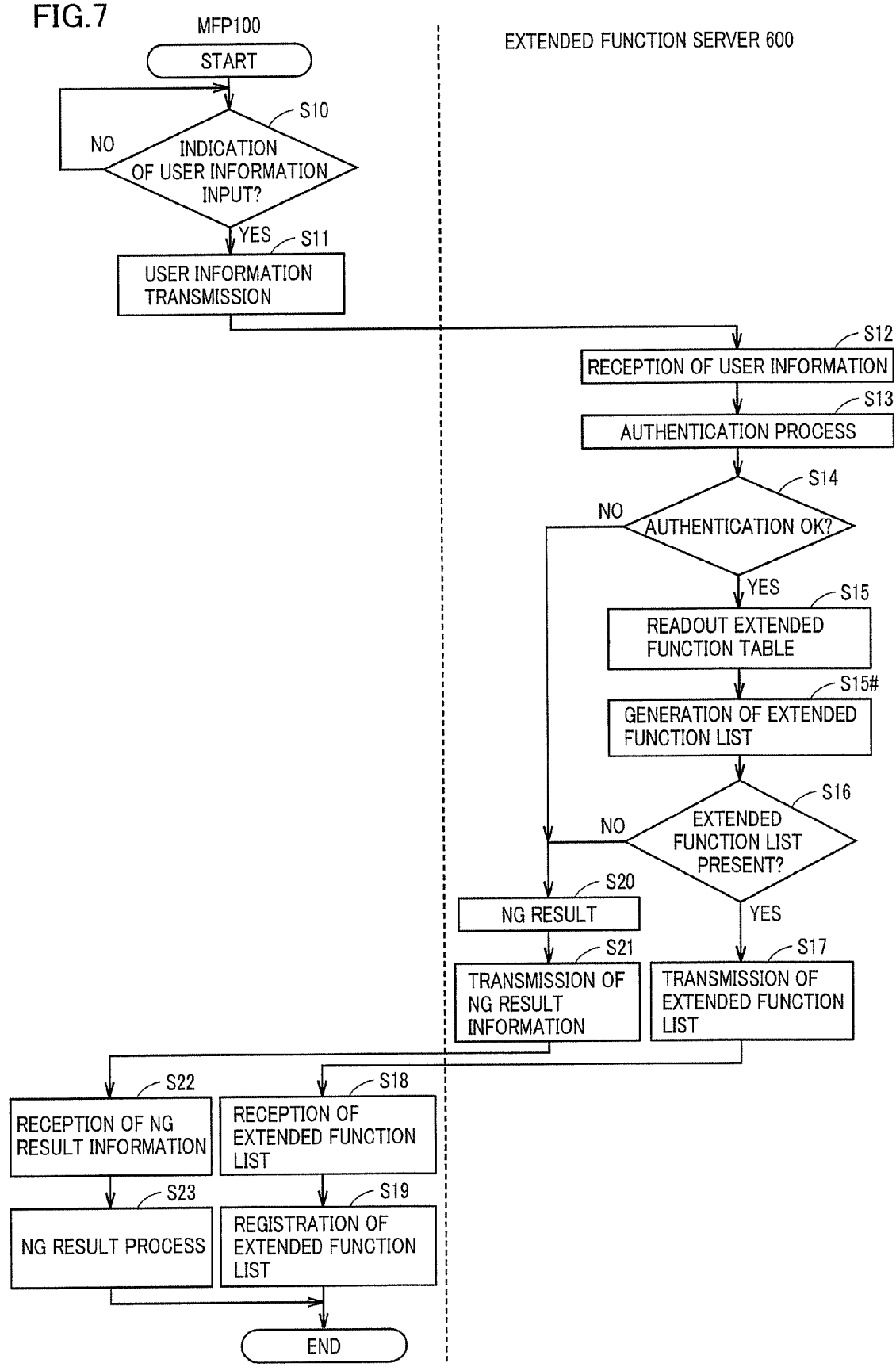
FIG. 7 is a flowchart to describe a process when an extended function list is to be registered according to an embodiment of the present invention.

Referring to FIG. 7, determination is made as to whether an input indication of user information has been made or not on the part of MFP 100 (step S10).

Specifically, determination is made as to whether a log-in screen, for example, has been displayed by the depression of log-in/log-out button 28, and the user has entered a user ID or the like that is registered as the authentication data. When determination is made that user information has been input at step S10, the user information (user ID or the like) is transmitted from user information transmission unit 115 to extended function server 600 (step S11). Specifically, the user information is transmitted as authentication data for the execution of a user authentication process.

Then, the user information is received at user authentication unit 601 on the part of extended function server 600 (step S12).

The user authentication process is executed at user authentication unit 601 (step S13). Specifically, an authentication process is executed at extended function server 600, based on whether the user ID registered as the authentication data matches the user ID included in the user information.

Then, determination is made as to whether the user authentication process has succeeded or not, i.e. whether the authenticity is established or not (step S14).

When determination is made that the authenticity has been established at step S14, function module management unit 603 reads out the extended function table that will be described afterwards, stored in function module storage unit 605 (step S15).

Function module management unit 603 generates an extended function list set in correspondence with the users, based on the extended function table stored in function module storage unit 605 (step S15#).

Then, determination is made as to whether there is an extended function list set in correspondence with users (step S16).

When determination is made that there is an extended function list in correspondence with users at step S16, function module management unit 603 provides the extended function list to function list transmission unit 607, from which the extended function list is transmitted (step S17).

When determination is made that the authenticity is not established, i.e., the user authentication process ends in failure, at step S14, an NG result is set (step S20). User authentication unit 601 transmits the NG result information (step S21).

An NG result is also set (step S20) when determination is made that there is no extended function list at step S16, in which case function list transmission unit 607 transmits the NG result information (step S21).

When there is an extended function list set in correspondence with users, extended function list reception unit 117 on the part of MFP 100 receives the extended function list transmitted from extended function server 600 (step S18).

The received extended function list is registered (step S19), and the process ends.

In the case where NG result information is transmitted, the NG result information is received on the part of MFP 100 (step S22). Then, an NG result process (step S23) is executed, and the process ends.

In the present embodiment, it is assumed that NG result information is transmitted when the user authentication process ends in failure at user authentication unit 601, and in the case where there is no extended function list. In view of the NG result information received when the user authentication process fails, it is assumed that entry of user information again is prompted on the part of MFP 100. In view of the NG result information corresponding to the absence of an extended function list, it is assumed that the process proceeds based on no extended function list. Namely, the process ends without any registration.

An extended function table stored in function module storage unit 605 will be described with reference to FIG. 8.

FIG. 8 represents an example of an extended function table stored in function module storage unit 605. Function module management unit 603 reads out the extended function table from function module storage unit 605 and generates an extended function list set in correspondence with users based on the read extended function table.

The example of FIG. 8 includes four types of extended function, corresponding to the function labels of "cleaning", "inclination correction", "searchable PDF", and "negative-positive process".

Specifically, the "cleaning" function is directed to automatically identifying an isolated point in the image data for removal. The "inclination correction" function is directed to correcting an inclination of the document data. The "searchable PDF" function corresponds to the process of generating a PDF file with transparent text data recognized from the image data through an OCR (Optical Character Reader) superimposed on a highly-compressed PDF (Portable Document Format). The "negative-positive process" function is directed to converting the brightness of the image.

The functions are classified into the main level and sublevel, corresponding to respective function labels. The main level is classified into "copy" and "scan". The sublevel is classified into "image adjustment" and "file format".

Users A, B and C are indicated as users who are allowed the usage of the MFP For example, users A and B are registered as the usage-allowed users for function items corresponding to "copy" as the main classification level and "image adjustment" as the sub classification level, with respect to the function label of "cleaning". In the context of the "cleaning" function, user B alone is registered as the allowable user for the function items of "scan" corresponding to the main classification level, and "image adjustment" for the sub classification level.

With regards to the function label of "inclination correction", users A and B are registered as usage-allowed users for function items corresponding to "copy" as the main classification level and "image adjustment" as the sub classification level. In the context of the "inclination correction" function, user A alone is registered as the allowable user for the function items of "scan" as the main classification level and "image adjustment" for the sub classification level.

The functions set forth above are only by way of example, and are not limited thereto, as long as it is an extendable function. Further, the classification is not limited to those set forth above.

An example of an extended function list in correspondence with user B will be described with reference to FIG. 9.

FIG. 9 represents an extended function list in correspondence with user B based on the extended function table that is stored in function module storage unit 605 of FIG. 8.

For example, when the user authentication process for user B is executed and the user authentication process succeeds (authenticity is established), an extended function list as shown in FIG. 9 is generated and transmitted to MFP 100.

The process of displaying extended function items in operation panel unit 105 based on the extended function list registered at memory unit 102 will be described with reference to FIG. 10.

Figure 10:
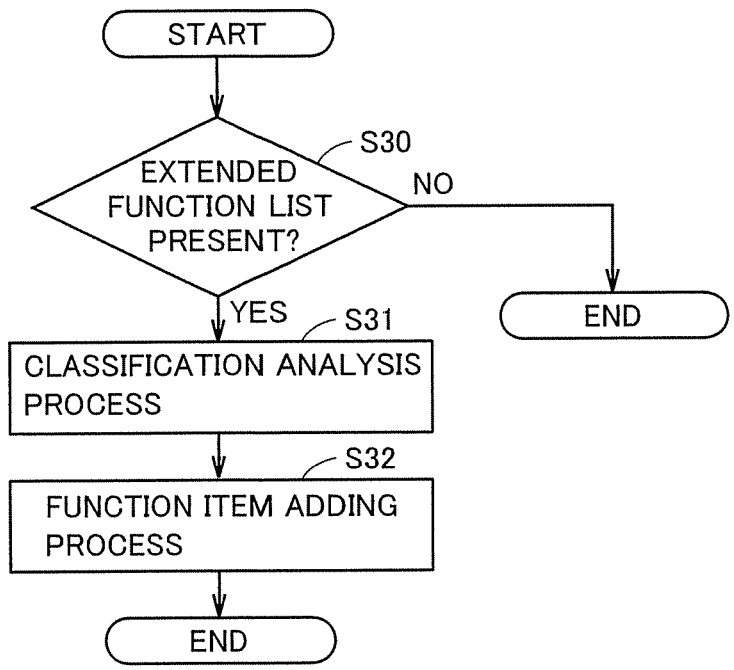
FIG. 10 is a flowchart to describe a process of displaying an extended function item at an operation panel based on an extended function list registered at a memory unit.

Referring to FIG. 10, panel control unit 121 determines whether there is an extended function list generated in correspondence with registered users in memory unit 102 (step S30).

When determination is made that there is an extended function list at step S30, then a classification analysis process is executed (step S31). Specifically, determination is made as to what process the extended function corresponds to, based on the main level and sublevel set in correspondence with each function included in the extended function list. For example, in the case where the main classification is "copy" in the function label of "cleaning" in FIG. 8, determination is made that it is an extended function corresponding to a copy function. When the sublevel corresponds to "image adjustment", determination is made that it is an extended function corresponding to the function item of image adjustment in a copy function.

Then, an adding process of a function item of an extended function is executed based on the relevant classification level analysis process result (step S32). Specifically, the item of the extended function is added and displayed at a predetermined screen on display region 20 of operation panel unit 105.

A hierarchy screen corresponding to the depression of "image adjustment" button 44 in display region 20 shown in FIG. 3 will be described with reference to FIG. 11.

Figure 11:
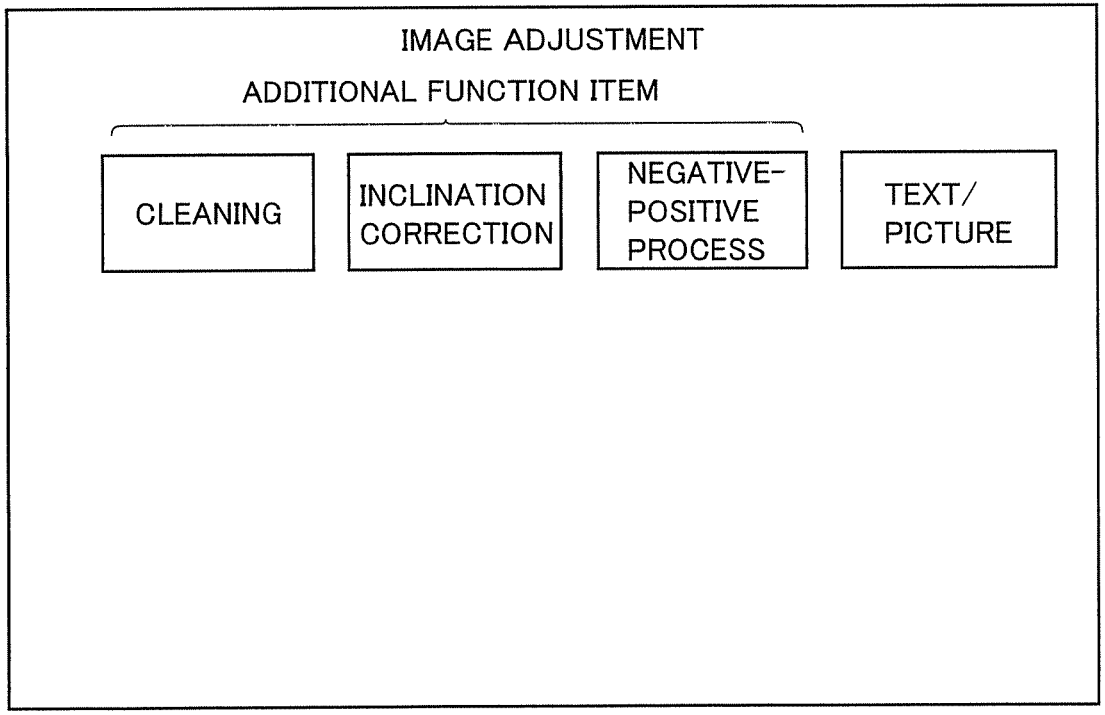
FIG. 11 is a diagram to describe a hierarchy screen when an "image adjustment" button is depressed on the display region shown in FIG. 3.

Referring to FIG. 11, a detailed setting screen for an image adjustment process set based on an extended function list corresponding to user B shown in FIG. 9 is indicated as an example in the present embodiment.

Specifically, based on the extended function list registered at memory unit 102, the function items of "cleaning", "inclination correction", "searchable PDF", and "negative-positive process" are added by panel control unit 121, and displayed at display region 20 to allow execution of a relevant function item. Accordingly, the user (user B) can select an item of the extended function functions of "cleaning", "inclination correction", and "negative-positive process", displayed at the detailed setting screen for an image adjustment process. Selection of a relevant function item allows execution of an extended function corresponding to a predetermined extended function item.

A screen having selection tab 24 specified for operating in a scan mode in display region 20 of FIG. 3 will be described with reference to FIG. 12.

Figure 12:
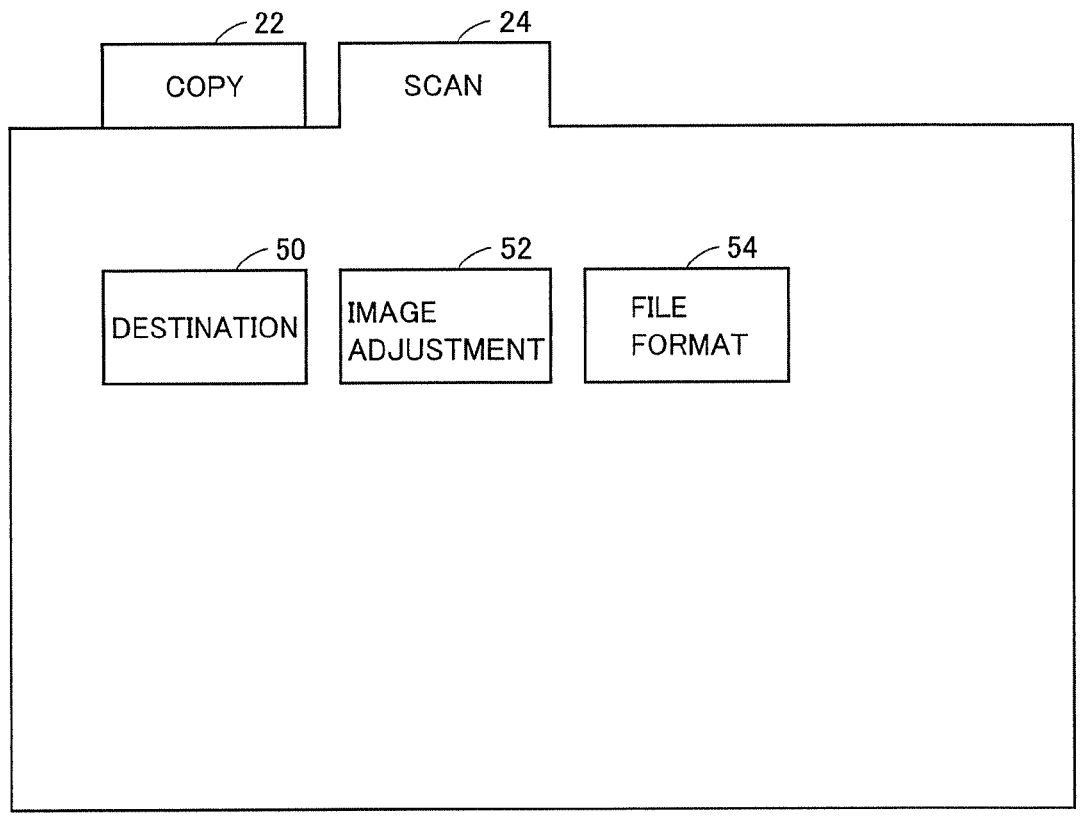
FIG. 12 is a diagram to describe a screen designating a selection tab to operate in a scan mode at the display region shown in FIG. 3.

Referring to FIG. 12, depression of selection tab 24 causes the display of the function buttons for a scan mode.

Specifically, a "destination" button 50 to set the party to which the transmission is to be addressed, an "image adjustment" button 52 for image adjustment, and a "file format" button 54 to specify the file format of the image data to be transmitted are indicated.

Depression of an appropriate button allows detailed setting of a relevant function.

A hierarchy screen corresponding to depression of "file format" button 54 in the screen for operating in a scan mode shown in FIG. 12 will be described with reference to FIG. 13.

Figure 13:
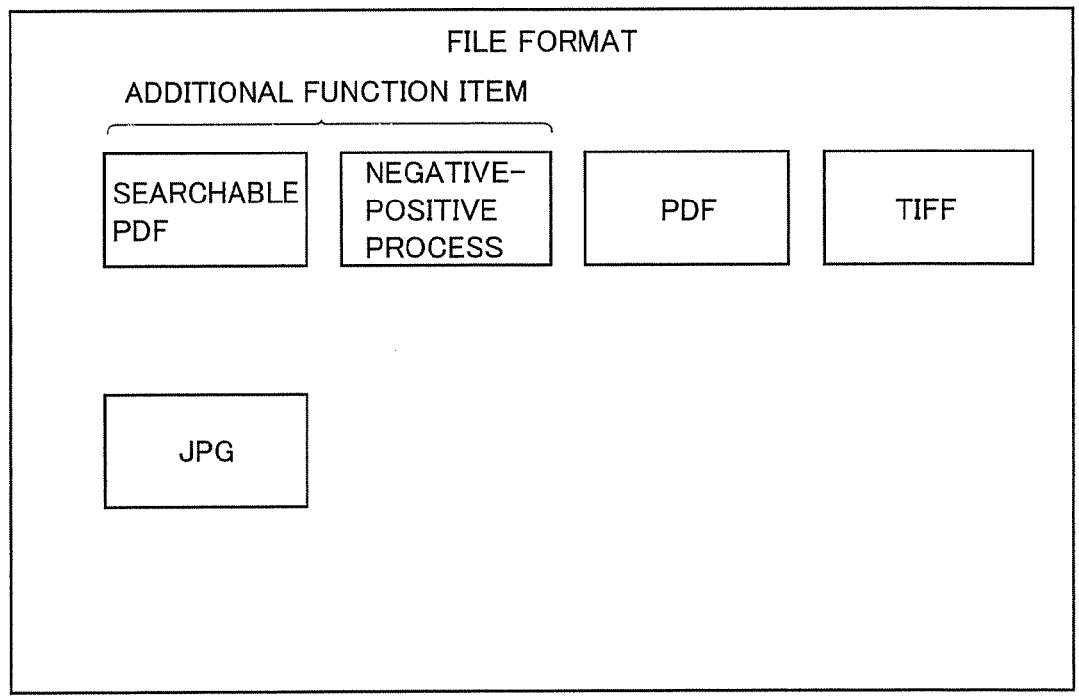
FIG. 13 is a diagram to describe a hierarchy screen when a "file format" button is depressed on a screen for operating in the scan mode shown in FIG. 12.

Referring to FIG. 13, a detailed setting screen to specify a file format set based on the extended function list in correspondence with user B shown in FIG. 9 is provided as an example in the present embodiment.

Specifically, the select items of "PDF", "TIFF" and "JPG" are indicated as the file format types, and the function items of "searchable PDF" and "negative-positive process" are newly added by panel control unit 121, based on the extended function list registered at memory unit 102, to be displayed at display region 20 so that execution of a relevant function item is allowed. The user (user B) can select the items of the extended functions of "searchable PDF" and "negative-positive process" displayed on the detailed setting screen directed to the file format. An extended function corresponding to a predetermined extended function item can be executed by selecting an appropriate function item.

The process flow of executing an extended function according to an embodiment of the present invention will be described hereinafter with reference to FIG. 14.

Figure 14:
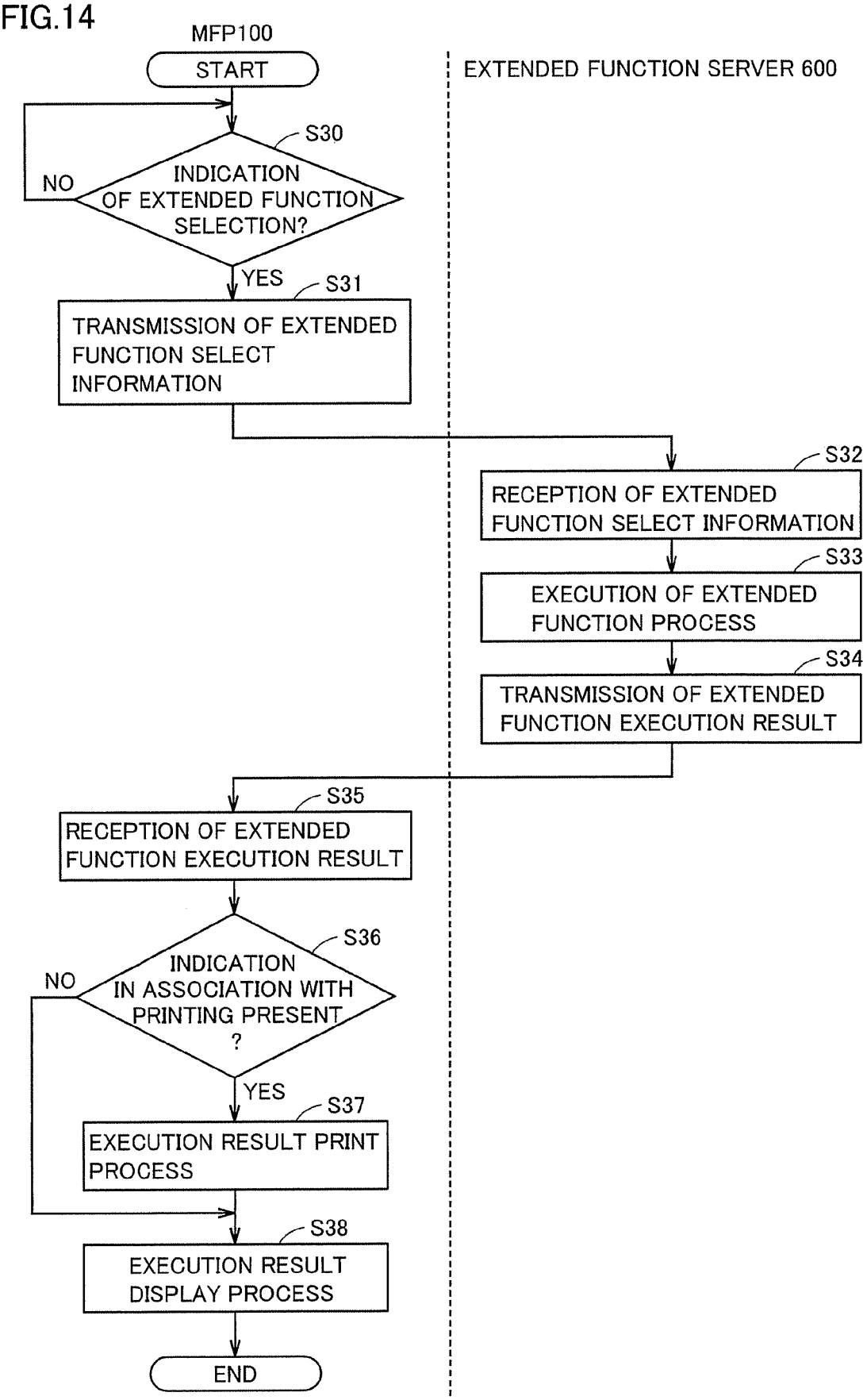
FIG. 14 is a flowchart to describe the flow of a process when an extended function is executed according to an embodiment of the present invention.

Referring to FIG. 14, determination is made as to whether selection of an extended function has been indicated at MFP 100 (step S30). Specifically, panel control unit 121 senses a selection indication of an extended function at operation panel unit 105, and provides the extended function select indication information to extended function select information transmission unit 125.

Panel control unit 121 receives an indication input of a copy operation or scan operation, and instructs text document read control unit 123 to cause execution of image reading through image reader unit 103.

Text document read control unit 123 responds to an instruction from panel control unit 121 to control image reader unit 103, and obtains image data read at image reader unit 103 with respect to the set text file (document).

Text document read control unit 123 responds to an indication from panel control unit 121 to output the obtained image data to extended function select information transmission unit 125 when selecting an extended function is indicated at operation panel unit 105.

Extended function select information transmission unit 125 transmits the extended function select indication information and the obtained image data as the extended function select information towards extended function server 600.

Extended function server 600 receives the extended function select information including the extended function select indication information and the obtained image data at extended function select information reception unit 609 (step S32).

Extended function select information reception unit 609 provides the received extended function select information to extended function execution unit 611.

Extended function execution unit 611 reads out a program directed to execution of a corresponding extended function stored in function module storage unit 605, according to the extended function select indication information included in the extended function select information, and executes an extended function process on the obtained image data in the extended function select indication information (step S33).

Then, extended function execution unit 611 outputs the executed extended function result to extended function execution result transmission unit 613.

Extended function execution result transmission unit 613 transmits the extended function execution result to MFP 100 (step S34).

On the part of MFP 100, the extended function execution result transmitted from extended function server 600 is received at extended function execution result reception unit 127 (step S35).

Then, determination is made as to whether an indication in association with printing is present for the execution result and the like (step S36) When there is an indication in association with printing for the execution result and the like, extended function execution result reception unit 127 outputs the execution result to print control unit 129. Specifically, in the case where an extended function of image data corresponding to a copy operation is executed, the image data subjected to execution of a relevant extended function process is output to print control unit 129 in response to an indication at panel control unit 121.

Printer control unit 129 outputs the data for executing a print process of the relevant execution result to printer unit 106. The print process of the execution result is executed at printer unit 106 (step S37). An execution result display process such as printer completion is executed (step S38). Then, the process ends.

When there is no indication in association with printing of the execution result or the like at step S36, a display process of function execution completion or the like, for example when in a scan mode or the like, is executed (step S38). Then, the process ends.

Although the present embodiment has been described based on a process of obtaining and storing an extended function list in a memory unit by means of extended function server 600, an extended function list set in correspondence with user's names may be stored in advance in a memory unit of the MFP, which may be subsequently referred to when the authentication by a user authentication process succeeds.

The above embodiment was described based on the scheme of obtaining an extended function list from extended function server 600 for function expansion as to a copy function and scan function. The extended function is not limited thereto. For example, an extended function list for a print function and FAX function, for example, may be obtained in a similar manner for extending the function.

Although the present embodiment has been described corresponding to the case where a program directed to executing an extended function is stored in function module storage unit 605 of extended function server 600, and a relevant program is read out for execution of an extended function, storing a relevant program in the memory unit in the MFP for execution of a relevant extended function is also allowed. In this case, the system can be configured to allow execution of an extended function indicated in the extended function list registered in correspondence with users.

In the present embodiment, the user authentication process has been described corresponding to the case where the user authentication process is executed at user authentication unit 601 of extended function server 600. It is also possible to provide an authentication unit directed to executing a user authentication process in the MFP. In this case, determination of whether the user authentication process has succeeded or not can be made based on whether the authentication data registered in the authentication unit matches the input authentication data.

Although the embodiment has described in which the user authentication process is executed at extended function server 600, execution of the user authentication process may be carried out at another server such as the authentication server.

The image processing apparatus of the present invention is not limited to an MFP, and may be a printer device, a facsimile device or the like. It is also possible to provide a program directed to executing the control as described in the flow through the operation of a computer. The program can be presented as a program product, recorded in a computer-readable recording medium such as a flexible disk belonging to the computer, a CD-ROM (Compact Disk-Read Only Memory), a ROM (Read Only Memory), a RAM (Random Access Memory), a memory card, and the like. Alternatively, the program may be presented in the form of being recorded on a recording medium such as a hard disk incorporated in a computer.

The program of the present invention may cause execution of a process by invoking, at a predetermined timing in a predetermined arrangement, the required module among the program modules presented as a part of the operation system (OS) of the computer. In this case, the program per se does not include the aforementioned module, and the process is executed in conjunction with the OS. Such a program absent of a module may be included in the program of the present invention.

Furthermore, the program of the present embodiment may be presented in the form of being incorporated as a part of another program. Similarly in this case, the program per se is absent of a module included in the another program, and the process is executed in conjunction with another program. Such a program incorporated in another program may be included as the program of the present invention.

The presented program product is installed in a program storage unit such as a hard disk for execution. The program product includes the program per se, and a recording medium in which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus for performing operation processes classified into one or more levels, where at least one level includes a plurality of functions, the image processing apparatus comprising:
    a display unit configured to display an operation item,
    an operation unit for accepting user authentication information in order to specify a user and for user selection of an operation process corresponding to said operation item displayed at said display unit,
    a data memory unit for storing
        for each function that can be extended at said image processing apparatus, extended function information registering a user who can use a relevant function, and
        extended function information received from a server upon authentication of said user, wherein (i) said extended function information is specific to said authenticated user and (ii) at least one extended function is associated with more than one of the functions in the at least one classification level,
    an extended function list generation unit for generating an extended function list of a function corresponding to said authenticated user, based on said obtained extended function information, and
    a display control unit for displaying, at said display unit, at least one extended function item of the generated extended function list that can be selected for said operation process, based on said extended function information stored in said data memory unit.

2. The image processing apparatus according to claim 1, further comprising:
    an information transmission unit for transmitting image data and extended function select indication information indicating execution of said extended function according to selection of an extended function item at said operation unit, said image data transmitted from said information transmission unit being subjected to execution of a predetermined image process based on said extended function select indication information, and
    an information reception unit for receiving an execution result of said predetermined image process on said image data.

3. The image processing apparatus according to claim 2, further comprising an image formation unit for executing an image formation process of the image data subjected to execution of the predetermined image process received at said information reception unit.

4. The image processing apparatus according to claim 1, wherein said server is connected to said image processing apparatus via a network.

5. The image processing apparatus according to claim 1, wherein said extended function information includes classification information for classifying, according to a job, a plurality of extended function items to be displayed at said display unit, and said display control unit displays an operation item to be displayed according to said job and an extended function item corresponding to said job, based on said classification information.

6. An image processing method of performing operation processes classified into one or more levels, where at least one level includes a plurality of functions, the method comprising the steps of:
    storing, in a data memory unit, for each function that can be extended at an image processing apparatus, extended function information registering a user who can use a relevant function,
    displaying, on a display unit of the image processing apparatus, an operation item and an operation unit that accepts user authentication information for specifying a user and user selection of an operation process of the image processing apparatus that corresponds to said operation item displayed at said display unit,
    executing a user authentication process using said authentication information input at said operation unit,
    obtaining, from a server upon authentication of said user, extended function information, wherein (i) said extended function information is specific to a user authenticated by said user authentication process and (ii) at least one extended function is associated with more than one of the functions in the at least one classification level,
    storing, in the data memory unit, the extended function information received from said server,
    generating, by an extended function list generation unit of the server, an extended function list of a function corresponding to a registered user authenticated by said user authentication process, based on said extended function information,
    displaying, on said display unit, at least one extended function item of the generated extended function list that can be selected for said operation process, based on said extended function information received from said server,
    transmitting image data and extended function select indication information indicating execution of said extended function according to selection of an extended function item, and
    receiving an execution result of execution of a predetermined image process based on said extended function select indication information with respect to said transmitted image data.

7. The image processing method according to claim 6, further comprising the step of executing an image formation process of the received image data subjected to execution of a predetermined image process.

8. The image processing method according to claim 6, wherein said server is connected to said image processing apparatus via said network, said image processing method further comprising the step of detecting, at said image processing apparatus, said server connected to said network.

9. The image processing method according to claim 6, wherein said extended function information includes classification information for classifying, according to a job, a plurality of extended function items to be displayed at said display unit, and said displaying step includes the steps of displaying an operation item to be displayed according to said job and an extended function item corresponding to said job, based on said classification information.

10. A non-transitory computer-readable recording medium recorded with an image processing program that causes a computer, for performing operation processes that are classified into one or more levels, where at least one level includes a plurality of functions, to execute a process including the steps of:

storing, in a data memory unit, for each function that can be extended at an image processing apparatus, extended function information registering a user who can use a relevant function, displaying, on a display unit of the image processing apparatus, an operation item and an operation unit that accepts user authentication information for specifying a user and user selection of an operation process corresponding to said operation item displayed at said display unit, executing a user authentication process using said user authentication information input at said operation unit, obtaining, extended function information from a server upon authentication of said user, wherein (i) said extended function information is specific to a specified user and (ii) at least one extended function is associated with more than one of the functions in the at least one classification level, storing, in the data memory unit, said extended function information obtained from said server, generating, by an extended function list generation unit of the server, an extended function list of a function corresponding to a registered user authenticated by said user authentication process, based on said extended function information, displaying at least one extended function item of the generated extended function list that can be selected for said operation process, based on said obtained extended function information, transmitting image data extended function select indication information indicating execution of said extended function according to selection of an extended function item, and receiving an execution result of execution of a predetermined image process based on said extended function select indication information with respect to said transmitted image data.

11. The non-transitory computer-readable recording medium according to claim 10, recorded with said image processing program causing the computer to execute a process further including the step of executing an image formation process of the received image data subjected to execution of a predetermined image process.

12. The non-transitory computer-readable recording medium according to claim 10, wherein said server is connected via said network, said image processing program further causing the computer to execute the step of detecting said server connected to said network.

13. The non-transitory computer-readable recording medium according to claim 10, wherein said extended function information includes classification information for classifying, according to a job, a plurality of extended function items to be displayed at said display unit, and said displaying step includes the steps of displaying an operation item to be displayed according to said job and an extended function item corresponding to said job, based on said classification information.

14. An image processing system comprising:
a server storing extended function information to extend a function, and
an image processing apparatus, connected to said server, for performing operation processes classified into one or more levels, where at least one level includes a plurality of functions, said image processing apparatus including:
a storage unit for storing, for each function that can be extended at said image processing apparatus, extended function information registering a user who can use a relevant function,
a display unit configured to display an operation item,
an operation unit for accepting user authentication information to specify a user and for executing an operation process selected by an authenticated user, said operation process corresponding to said operation item displayed at said display unit,
an information reception unit for obtaining extended function information from said server upon authentication of said user, wherein (i) said extended function information is specific to said authenticated user and (ii) at least one extended function is associated with more than one of the functions in the at least one classification level,
an extended function list generation unit for generating an extended function list of a function corresponding to said authenticated user, based on said obtained extended function information, and
a display control unit for displaying, at said display unit, at least one extended function item of the generated extended function list that can be selected for said operation process at said operation unit, based on said extended function information stored in said server and obtained at said information reception unit.

15. The image processing system according to claim 14, wherein
said image processing apparatus further includes an information transmission unit for transmitting image data and extended function select indication information indicating execution of said extended function according to selection of an extended function item at said operation unit,
said server further includes an extended function execution unit for executing a predetermined image process based on said extended function select indication information on the image data transmitted from said image transmission unit, and an extended function execution result transmission unit for transmitting an execution result of a predetermined image process executed at said extended function execution unit,
said image processing apparatus further including an information reception unit for receiving an execution result of the predetermined image process on said image data transmitted from said extended function execution result transmission unit.

16. The image processing system according to claim 15, said image processing apparatus further including an image formation unit for executing an image formation process of the image data subjected to execution of a predetermined image process received at said information reception unit.

17. The image processing system according to claim 14, wherein said server is connected via a network.

18. The image processing system according to claim 17, said image processing apparatus further including a detection unit detecting said server connected to said network.

19. The image processing system according to claim 14, wherein said extended function information includes classification information for classifying, according to a job, a plurality of extended function items to be displayed at said display unit, and said display control unit displays an operation item to be displayed according to said job and an extended function item corresponding to said job, based on said classification information.

20. An extended function server connected with an image processing apparatus capable of extending a function, and configured to communicate therewith through a network, said extended function server comprising:
 a storage unit for storing, for each function that can be extended at said image processing apparatus, extended function information registering a user who can use a relevant function;
 a user information reception unit for receiving user information transmitted from said image processing apparatus;
 a user authentication unit for authenticating a user based on said received user information;
 an extended function list generation unit for generating an extended function list of a function corresponding to a registered user authenticated by said user authentication unit, based on said extended function information; and
 a transmission unit for transmitting to said image processing apparatus the extended function list generated at said extended function list generation unit.

21. The extended function server according to claim 20, wherein said storage unit can register, for each said function that can be extended, a plurality of users who can use a relevant function.

22. A method for operating a server to extend a function at an image processing apparatus connected to the server through a network, the method comprising:
 storing, in a storage unit, for each function that can be extended at the image processing apparatus, extended function information registering a user who can use a relevant function;
 receiving, by a user information reception unit of the server, user information transmitted from said image processing apparatus;
 authenticating, by a user authentication unit of the server, a user based on said received user information;
 generating, by an extended function list generation unit of the server, an extended function list of a function corresponding to a registered user authenticated by said user authentication unit, based on said extended function information; and
 transmitting, by a transmission unit of the server, said generated extended function list to said image processing apparatus.

23. The method according to claim 22, wherein said storage unit can register, for each said function that can be extended, a plurality of users who can use a relevant function.

24. A non-transitory computer-readable recording medium recorded with an image processing program that causes a computer to execute a process for extending a function at an image processing apparatus connected to the computer through a network, to execute a process including the steps of:
 storing, for each function that can be extended at said image processing apparatus, extended function information registering a user who can use a relevant function;
 receiving user information transmitted from said image processing apparatus;
 authenticating, by a user authentication unit, a user based on said received user information;
 generating, by an extended function list generation unit, an extended function list of a function corresponding to a register user authenticated by said user authentication unit, based on said extended function information; and
 transmitting, by a transmission unit, said generated extended function to said image processing apparatus.

25. The non-transitory computer readable recording medium according to claim 24, wherein said storage unit can register, for each said function that can be extended, a plurality of users who can use a relevant function.

26. An image processing system comprising:
 a server connected with an image processing apparatus capable of extending a function, said server including:
  a storage unit for storing, for each function that can be extended at said image processing apparatus, extended function information registering a user who can use a relevant function, and
  an extended function list generation unit for generating an extended function list of a function corresponding to a registered user authenticated by a user authentication unit, based on said extended function information; and
 said image processing apparatus, connected to said server, for performing operation processes classified into one or more levels, where at least one level includes a plurality of functions, said image processing apparatus including:
  a display unit configured to display an operation item,
  an operation unit for accepting user authentication information to specify a user and for executing an operation process selected by an authenticated user, said operation process corresponding to said operation item displayed at said display unit,
  an information reception unit for obtaining extended function information from said server upon authentication of said user, wherein (i) said extended function information is specific to said authenticated user and (ii) at least one extended function is associated with more than one of the functions in the at least one classification level, and
  a display control unit for displaying, at said display unit, at least one extended function item of the generated extended function list that can be selected for said operation process at said operation unit, based on said extended function information stored in said server and obtained at said information reception unit.

* * * * *